(12) United States Patent
Volkmann et al.

(10) Patent No.: US 8,851,511 B1
(45) Date of Patent: Oct. 7, 2014

(54) SHAPED AIRBAG

(71) Applicants: Matthias Volkmann, Kronberg (DE); Martin Pieruch, Hochheim (DE)

(72) Inventors: Matthias Volkmann, Kronberg (DE); Martin Pieruch, Hochheim (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 13/908,398

(22) Filed: Jun. 3, 2013

(51) Int. Cl.
*B60R 21/207* (2006.01)
*B60R 21/2338* (2011.01)
*B60R 21/20* (2011.01)

(52) U.S. Cl.
CPC .................................... *B60R 21/20* (2013.01)
USPC .................................... 280/730.2; 280/743.2

(58) Field of Classification Search
USPC .......................... 280/729, 730.2, 743.1, 743.2
IPC ........................... B60R 21/207,21/21, 21/2338
See application file for complete search history.

(56) References Cited

U.S. PATENT DOCUMENTS

| | | | | |
|---|---|---|---|---|
| 5,496,061 | A * | 3/1996 | Brown ........................ | 280/730.2 |
| 5,785,350 | A * | 7/1998 | Inoue et al. ................. | 280/743.2 |
| 6,783,151 | B2 * | 8/2004 | Rasch et al. .................. | 280/729 |
| 7,192,050 | B2 * | 3/2007 | Sato et al. .................... | 280/729 |
| 7,207,595 | B2 * | 4/2007 | Kanto et al. ................ | 280/730.2 |
| 7,445,234 | B2 * | 11/2008 | Hofmann ................... | 280/730.2 |
| 7,549,672 | B2 * | 6/2009 | Sato et al. .................. | 280/730.2 |
| 7,594,678 | B2 * | 9/2009 | Schedler ...................... | 280/743.2 |
| 7,780,191 | B2 * | 8/2010 | Sato ............................ | 280/730.2 |
| 7,793,973 | B2 * | 9/2010 | Sato et al. ................... | 280/730.2 |
| 7,819,419 | B2 * | 10/2010 | Hayashi et al. ............. | 280/730.1 |
| 7,819,423 | B2 * | 10/2010 | Loibl et al. ................. | 280/730.2 |
| 8,360,469 | B2 * | 1/2013 | Wiik et al. .................. | 280/743.2 |
| 8,448,981 | B2 * | 5/2013 | Fukawatase ............... | 280/730.2 |
| 8,480,123 | B2 * | 7/2013 | Choi et al. .................. | 280/730.2 |
| 8,480,128 | B2 * | 7/2013 | Fukawatase et al. ...... | 280/743.1 |
| 8,657,330 | B1 * | 2/2014 | Choi ........................... | 280/730.2 |
| 2007/0108745 | A1 * | 5/2007 | Belwafa et al. ............. | 280/730.2 |
| 2009/0200774 | A1 * | 8/2009 | Nam et al. .................. | 280/730.2 |
| 2014/0035264 | A1 * | 2/2014 | Fukushima et al. ........ | 280/730.2 |

FOREIGN PATENT DOCUMENTS

| | | | | |
|---|---|---|---|---|
| JP | | 2011131755 A | * | 7/2011 |
| JP | | 2012046050 A | * | 3/2012 |

* cited by examiner

*Primary Examiner* — Ruth Ilan
*Assistant Examiner* — Laura Freedman
(74) *Attorney, Agent, or Firm* — Markell Seitzman

(57) ABSTRACT

A side airbag cushion (10, 10A or 10B) has a front side panel (22), a rear side panel (24), a top panel (26) spaced between the upper edges of the front and rear side panels (22, 24), and a bottom panel (28) spaced between the lower edges of the front and rear side panels (22, 24). The top and bottom panels (26, 28) are configured to create a contoured or concavity (23) shaped fully inflated side airbag cushion with a larger sized forward end (27) volume and with a smaller sized volume at the occupant mid-location (25) wherein the inflated airbag cushion fills the gap between the door trim (7) and the occupant (2).

15 Claims, 4 Drawing Sheets

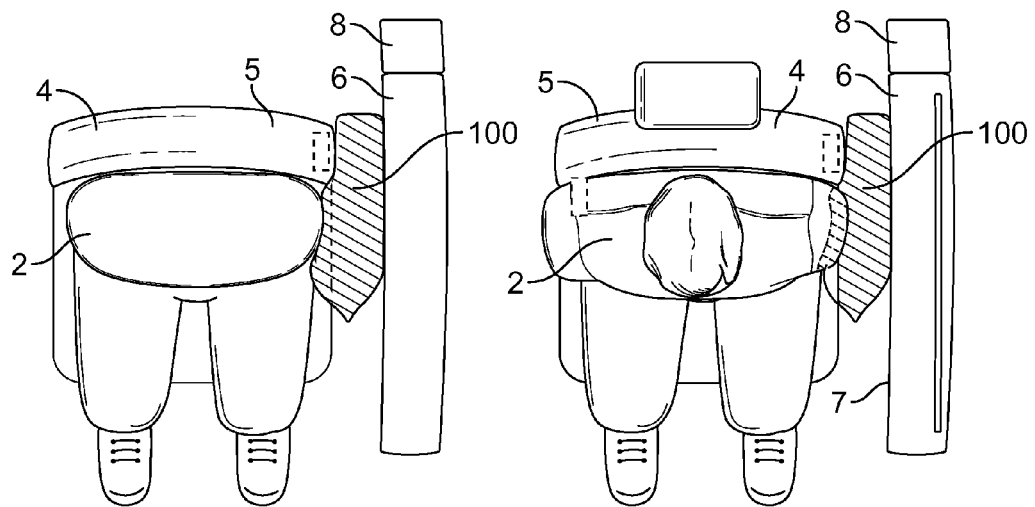
FIG. 1a
Prior Art
FIG. 1b
Prior Art
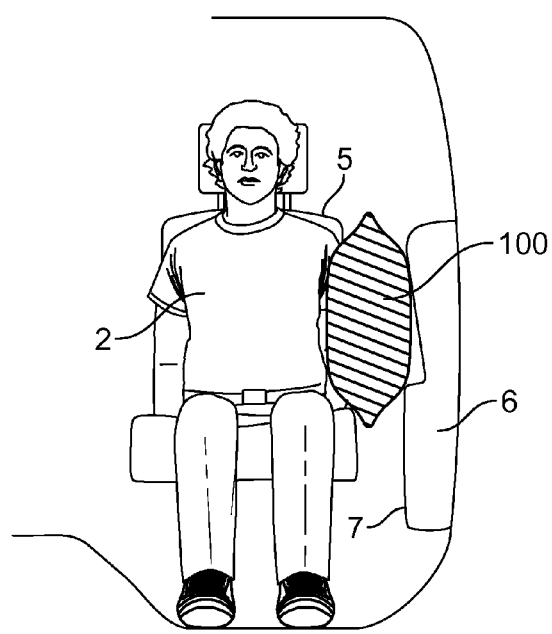
FIG. 1c
Prior Art

SHAPED AIRBAG

FIELD OF THE INVENTION

The present invention relates to seat mounted side airbags generally, more specifically to an improved shape of the inflatable cushion.

BACKGROUND OF THE INVENTION

In a side collision, a vehicle occupant is thrust laterally toward or away from the door of the vehicle depending on the direction or location of the impact forces. The use of a frontal passenger or driver side airbag provides little or no protection against side impacts.

To provide occupant protection, side curtain airbags mounted and deployed from the roof rail provide head, neck and some upper shoulder cushioning.

In some cases, an airbag module can be fitted inside a vehicle seatback on the side closest a door. These airbags typically inflate projecting forwardly from the seatback and occupy the space between the vehicle door interior trim and the driver or passenger.

These seat mounted side airbag cushions when constructed with two panels stitched together inflate create a center bulge. This center bulging balloons outwardly applying a load on the occupant which does cushion the impact, but does so in a forward or backward or sideways direction dependent on the position of the occupant relative to the maximum expansion or bulge of the inflated airbag. This can cause the occupant to be twisted or bent on deployment.

Ideally, the occupant who is properly secured by the seatbelt assembly should not be pushed sideways by the cushion. At the onset of an accident, the seatbelt assembly with a pre-tensioned shoulder harness or strap is firmly holding the occupant against the seatback. The inflation of a seat mounted side airbag cushion that has a typical center bulge actually pushes on the occupant typically inwardly toward the center of the vehicle passenger compartment and if the occupant is pushed sufficiently extremely the shoulder harness could be dislodged. Therefore, the typical two panel side airbag cushion has a characteristic shape that creates loads on the occupant that can be non-uniform and inwardly pushing on the lower torso.

It is therefore an objective of the present invention to provide a new airbag cushion that avoids these issues and yet provides additional occupant protection.

SUMMARY OF THE INVENTION

A side airbag cushion has a front side panel, a rear side panel, a top panel spaced between the upper edges of the front and rear side panels, and a bottom panel spaced between the lower edges of the front and rear side panels. The top and bottom panels are configured to create a contoured shaped fully inflated side airbag cushion with a larger sized forward end volume and with a smaller sized volume at the occupant mid-location wherein the inflated airbag cushion fills the gap between the door trim and the occupant.

Preferably, the side airbag cushion's forward end projects at least 20%, preferably at least 50% or more than the mid-location. The airbag cushion has a rear end connected to an airbag module. The top and bottom panels are similar in size and shape, most preferably the top and bottom panels are the same size and shape. Each of the top and bottom panels has a curved forward edge adjacent the occupant. The curved forward edge has a maximum inward concave curvature at the mid-location resulting in a minimum thickness at this location.

The top panel and the bottom panel have a rear edge adjacent the door trim. The rear edge is generally straight. In a first embodiment, the side airbag cushion has the inflated side airbag cushion with the top panel and bottom panel having a mid-located curvature extending from a straight portion adjacent a seatback to the larger sized forward end, the space between forward end and the seatback forming an occupant space.

The side airbag cushion may further have an internal panel internally sewn or otherwise affixed to the front and rear side panels. The internal panel is generally vertically oriented. The internal panel helps retain the contoured shape at or near the mid-location.

BRIEF DESCRIPTION OF THE DRAWINGS

The invention will be described by way of example and with reference to the accompanying drawings in which:

FIGS. 1a, 1b and 1c are prior art schematics showing top views of an occupant torso and an occupant seated in a vehicle seat and a frontal view of the seated occupant with a prior art side airbag cushion deployed and inflated.

DETAILED DESCRIPTION OF THE INVENTION

Figures 2A, 2B:
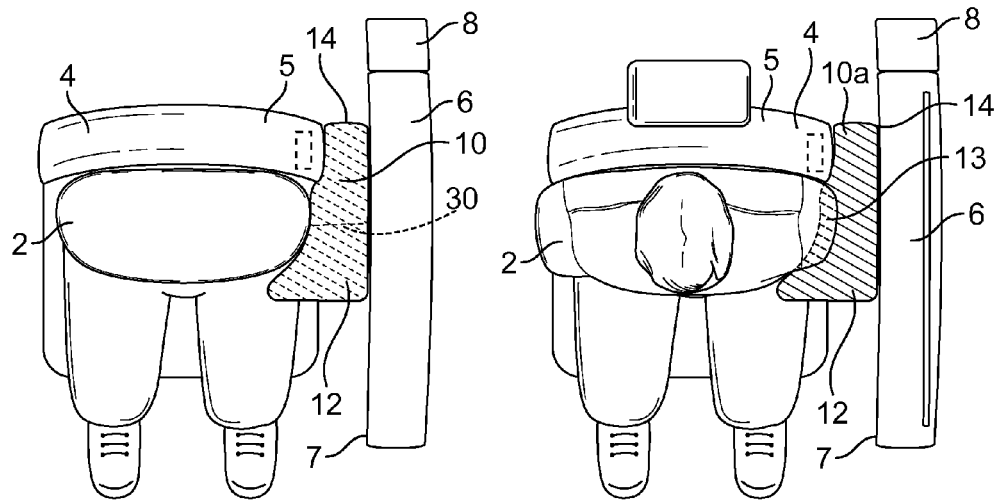
FIGS. 2a, 2b and 2c are similar schematic views with a contoured side airbag cushion of the present invention.

With reference to FIGS. 1a, 1b and 1c; there is a schematic illustration of a vehicle occupant 2 sitting in a vehicle seat 4. The occupant 2 as shown is sitting on a passenger seat 4 adjacent to a door 6 on the occupant's left hand side as illustrated. The rear part of the door shows the location of a B pillar 8 of a vehicle. As shown, the door trim 7 extends inwardly into the passenger compartment. In FIG. 1a, the torso of the occupant 2 is shown wherein a side airbag 100 of the prior art is shown in an inflated condition. This airbag 100 has the peripheral edges seamed together to form the inflated airbag cushion 100. As such there is a large bulge towards the center of the airbag 100. As the airbag 100 projects forward, it slides along the door trim 7 and inflates expanding inwardly towards the passenger compartment directly against the occupant 2. As shown in FIG. 1b in dashed lines, the shoulder of the occupant 2 and the airbag 100 are occupying the same space. As a result, as the airbag 100 inflates and the pressure increases, the occupant 2 is pushed with a load inwardly toward the center of the passenger compartment. As shown in FIG. 1c from a frontal view, the lack of space between the airbag 100 and the occupant 2 creates an effect that causes the occupant 2 to be pushed away from the door. Under normal conditions, this vehicle occupant 2 will be wearing a shoulder harness and the side airbag 100 will be pushing against the occupant 2 in a direction lateral to the shoulder harness. This loading is undesirable and believed to be unnecessary for the protection from a side impact. The shoulder harness and lap belt of a typical seat belt system is shown diagrammatically in FIG. 1c.

Figure 2C:
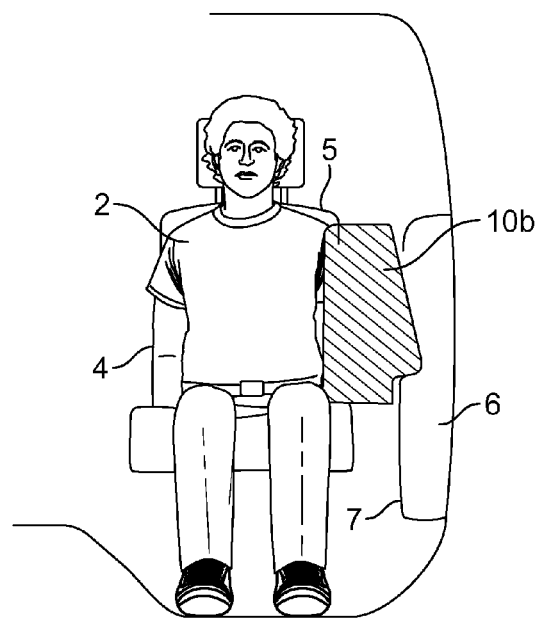
Figure 3:
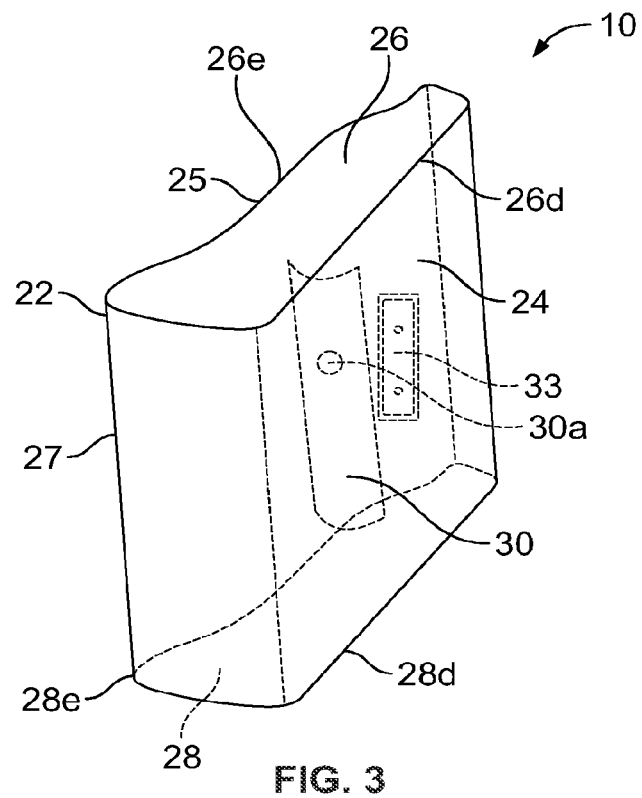
FIG. 3 is a perspective view of the side airbag cushion of the present invention as it appears when inflated.

With reference to FIGS. 2a, 2b and 2c; similar views to FIGS. 1a, 1b and 1c are shown, with an occupant 2 seated in a seat 4, however, in this view the occupant 2 is shown with an inflated side airbag cushion 10 of the present invention. The side airbag cushion 10, 10B has an enlarged frontal portion 12 as shown in FIGS. 2a and 2b that tends to wrap around the front of the occupant 2. This wrapping around creates an enlarged volume in the forward or frontal portion 12 of the side airbag 10, 10A. The side airbag 10, 10A, 10B extends along the door 6 adjacent to the door trim 7 and at a mid-location 25 at approximately the location of the vehicle occupant 2 there is shown in FIG. 3 an internal panel or tether 30 that helps restrain the airbag 10 from projecting inward against the occupant 2. Towards the rear portion 14 of the airbag 10 in FIG. 2a, the airbag 10 is shown in such a configuration wherein as it extends from the seat back 5 forward it enlarges or increases in size at its forward end. In FIG. 2b, the airbag cushion 10A is shown with a concavity 13 around the occupant 2. This concave curvature creates a cavity 13 in which the airbag 10A actually surrounds the occupant 2 at the shoulder level as illustrated in FIG. 2b. In this view, the airbag 10A has an enlarged forward end or frontal portion 12 and an enlarged rearward end or portion 14 with a minimal cross-section at the mid-location where the occupant 2 is seated. As shown in a frontal view of FIG. 2c, the airbag 10B is shown adjacent the occupant 2 in a cross-section such that the occupant 2 is shown with no pressure being applied directly against the normally sized adult occupant 2 when he is seated normally in a seat 4. This is preferred because as the side impact occurs, the occupant 2 will be thrust either inwardly into the center of the passenger compartment or outwardly against the door 6. If pushed outwardly against the door 6 or if the door 6 is being projected inwardly due to the impact, the airbag cushion 10, 10A, 10B will provide adequate protection from the side collision along the region between the shoulders and the lower torso. Not shown is a curtain airbag that could provide additional protection for the side in the upper shoulder and the head region of the occupant 2.

To better appreciate the construction of the cushion airbag 10, 10A or 10B for a side airbag module, it is important to understand that the airbag can have a front first side panel 22 adjacent the occupant 2 and a rear second side panel 24 against the door 6. As used herein the front side is adjacent the occupant or interior of the passenger compartment and rear side is adjacent the door trim. These side panels 22, 24 can be made in one-piece and folded to create the front and rear panels 22, 24. The single piece side panel extends from the rearward portion 14 to the frontal portion 12 back to the opposite rearward portion 14. Interposed between the front panel 22 and the rear panel 24 would be placed a top panel 26. The top panel 26 as shown could have a contour 23 wherein a large front end 27 is created having a width substantially larger, at least 20%, preferably at least 50% or more than at the mid-location 25 of the top panel 26 and bottom panel 28. The mid-location 25 is the location that approximates where the vehicle occupant 2 will be sitting. As the top panel 26 extends rearwardly back to the seatback 5, it can taper inwardly if necessary as shown in FIG. 3. As shown, a bottom panel 28 corresponds in size and shape to the top panel 26. Both the top panel 26 and the bottom panel 28 are preferably sewn to the front 22 and rear 24 side panels. The side panels 22, 24 as illustrated will meet at a forward location and be sewn with a stitch or if made of one piece will simply wrap around the one piece panel as illustrated. Inside the cushion airbag 10, 10A or 10B is an internal panel 30. The internal panel 30 is sewn to the front side panel 22 and to the rear side panel 24 and extends a distance slightly less than the full vertical length of the side cushion airbag. By stopping short, the internal panel 30 allows the airflow to go above and below the internal panel 30. The internal panel 30 further could be provided with optional hole or openings 30a to permit gas flow thereacross. The purpose of the internal panel 30 is to provide a limit or restraint at the mid-location 25 of the side airbag cushion 10, 10A or 10B so there are no bulges in the airbag. This restraint of bulging occurs naturally at the top and bottom panel due to the size and the location of the contour of the top 26 and bottom 28 panels as cut; however, in the mid-location 25 there is a tendency for the airbag 10, 10A or 10B to bulge slightly. To prevent this, the internal panel 30 can be provided to limit bulging of the side airbag 10, 10A or 10B pushing on the vehicle occupant 2 when the occupant 2 is in the normal seated position.

Figure 4:
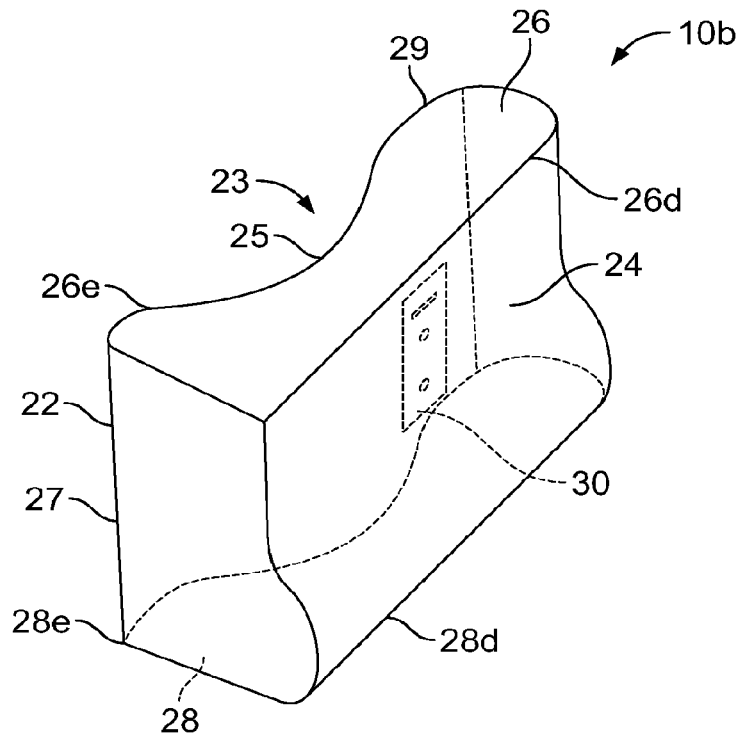
FIG. 4 is a perspective view off a second embodiment side airbag cushion of the present invention in its inflated appearance.

With reference to FIG. 4, a second alternative embodiment of the present invention is illustrated wherein the top panel 26 and the bottom panel 28 have a concavity 23 with a curvature such that the front end 27 as previously mentioned is enlarged to a greater extent relative to the rear end 29 of the side cushion airbag 10A and the rear portion 29 of the top panel 26 is also enlarged. This creates a larger chamber toward the rear of the seat 4 and a larger chamber toward the front of the seat 4 with the nadir of the concavity 23 being the minimum cross section. As previously noted, the front side panel 22 and the rear side panel 24 of this embodiment also may have an internal panel 30 as illustrated by dashed lines provided to restrain the mid-location from bulging out. In this embodiment, the large concavity 23 creates a recess in which the airbag 10A when inflated can project outwardly and actually encapsulate or surround the side portion of the vehicle occupant 2 both forward and rearwardly. As shown in FIGS. 3 and 4, the square panel 33 is the inflator connection area and shows a reinforcement layer with a slot for inflator insertion and the two holes for the fixation studs.

Figure 5:
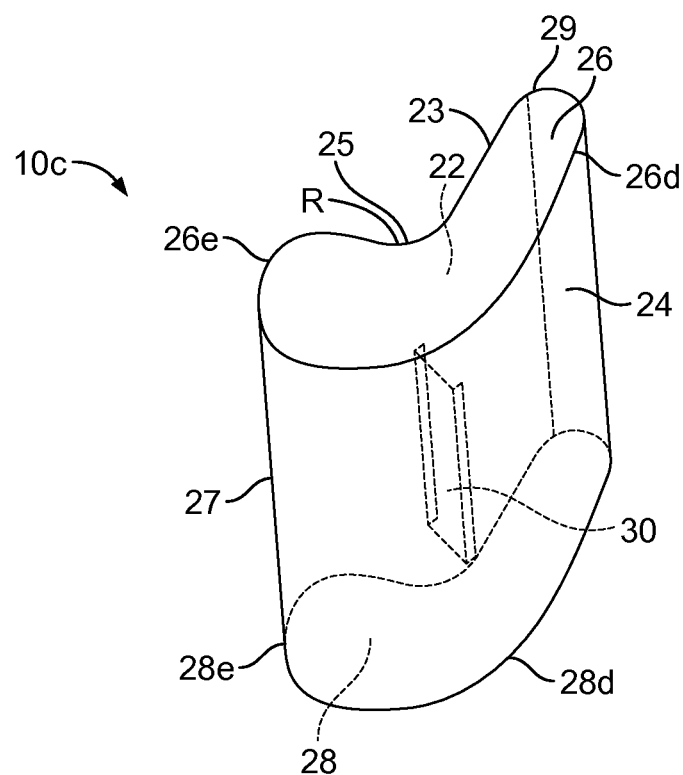
FIG. 5 is a perspective view of a third embodiment side airbag cushion of the present invention in its inflated appearance.

In FIG. 5, a third embodiment is shown wherein the side cushion airbag 10B has the rear 24 and front 22 panel at the rearward location 29 extended generally outwardly having a minimum cross section or width along the length up to the mid-location 25. On a slight skewed angle, an internal panel 30 is shown at the radius of curvature R wherein the top panel 26 bends outwardly to create an enlarged bulbous front end 27. This enlarged bulbous end 27 creates a large volume chamber. The occupant 2 seated in the seat 4 will be positioned directly behind this large bulbous portion or end 27 and the mid-location 25 will be at the start of the radius of curvature R in such a location that the occupant 2 would be seated along the area of minimum cross-section or width which extends in this embodiment from the curvature R all the way back to the seat back rear portion 29.

As illustrated in each of the embodiments and as previously discussed, the front panel 22 and rear panel 24 may be made from a one-piece construction. As such, there is a minimization of seams. The only seams would be at the top 26 and bottom 28 panels which are sewn around the peripheral edges of the front 22 and rear 24 panel portions or panels. The seam at the top panel 26 forms a curved forward edge 26e and the seam at the bottom panel has a curved forward edge 28e. Both edges 26e, 28e have a maximum inward curvature at the mid-location 25. The rear seam adjacent the door trim 7 has a rear edge 26d or 28d at the top and bottom panel respectively. These edges are generally straight. In this construction, the airbag 10, 10A or 10B has a defined contour predetermined by the size and shape of the top and bottom panels 26, 28. In each of the embodiments illustrated, an internal panel 30 is shown that provides a restraint or limit of the airbag cushion 10, 10A or 10B from projecting inwardly at a mid-location 25 where the occupant 2 will be seated. This internal panel 30 also is sewn directly to the front 22 and rear 24 panels and upon inflation is stretched such that the internal panel 30 creates a restraint from the two opposing front and rear panel portions from bulging inwardly to load or otherwise push on the seated occupant 2. In each of the embodiments shown, the internal panel 30 is shown extending vertically upwardly relative to the vehicle. This is believed to be a preferred orientation, however, the internal panel 30 could be positioned on a slight angle if so desired or alternatively, provided with one or more openings to allow gas to pass through the internal panel 30. As shown in each of the embodiments, the internal panel 30 extends a distance spaced from both the top and bottom panels 26, 28. This feature provides for an internal passageway for the inflation gases to fill the forward part or end 27 of the side airbag cushion. The advantage of the internal 30 panel is that it not only restrains the cushion, but it also delays slightly the inflation of the enlarged portion of the cushion airbag. This is advantageous because as the airbag 10, 10A or 10B is deploying, it must pass by the vehicle occupant 2 and by having the forward portion 27 inflating at a slightly delayed condition the entire front end of the airbag will be positioned forward of the occupant 2 as the enlarged forward volume chamber is filled. Once filled, the entire airbag provides a cushion between the door trim 7 and vehicle occupant 2.

What is interesting about the current invention is that the gap between the side door trim 7 and the vehicle occupant 2 can be tailor fit to accommodate the space between the vehicle occupant 2 and the door trim 7 in such a way that the side airbag can provide a cushioning effect preferably with a minimum cross-section at a location adjacent the vehicle occupant 2 and an enlarged portion forward end 27 of the airbag protects the vehicle occupant 2 such that the occupant 2 is restrained by the seat belt, is further provided cushioning along the side and in front by at least a portion of the side airbag.

As shown, the vehicle airbag cushion 10, 10A or 10B projects outwardly from the seatback 5. This is believed to be the preferred method of attaching. It is understood although not illustrated that this vehicle airbag 10, 10A or 10B could be attached to an airbag module mounted internally of the seat 4 which on deployment would provide inflation gases which would fill this new and improved side cushion airbag. While the airbag 10, 10A or 10B is shown in the present embodiments in three alternative configurations, it is understood that additional alternatives can be provided; however, it is believed important that the occupant 2 be positioned in such a location that there is either a concavity or contour adjacent the occupant 2 that prevents the airbag from inducing loads on the occupant 2 unless the occupant 2 is being thrust into the side door 6 at which point the airbag 10, 10A or 10B acts as a cushion preventing injury.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An inflatable cushion (10, 10A, 10B) extending from a seat (4) of a vehicle comprises:
   a front first side panel (22);
   a rear second side panel (24);
   a top panel (26) spaced between an upper edge of the front and rear side panels (22, 24);
   a bottom panel (28) spaced between a lower edge of the front and rear side panels (22, 24); and
   wherein the top and bottom panels (26, 28) are configured to create a contoured shaped (23), fully inflated side airbag cushion (10) extending from the seat (4) along a door (6) adjacent to a door trim (7) with a larger sized forward end (27) volume and with a smaller sized end (29) volume at a mid-location region (25) wherein the inflated airbag cushion (10) fills a gap between the door trim (7) and the vehicle seat (4) wherein the contoured shape (23) has the smaller sized end (29) volume at the mid-location region (25) extend vertically from the bottom panel to the top panel.

2. The inflatable cushion (10, 10A, 10B) of claim 1 wherein the forward end (27) projects at least 50% greater than the mid-location (25).

3. The inflatable cushion (10, 10A, 10B) of claim 2 wherein the airbag cushion (10) has a rear end (29) connected to an airbag module.

4. The inflatable cushion (10, 10A, 10B) of claim 1 wherein the top and bottom panels (26, 28) are similar in size and shape.

5. The inflatable cushion (10, 10A, 10B) of claim 4 wherein the top and bottom panels (26, 28) are the same size and shape.

6. The inflatable cushion (10, 10A, 10B) of claim 1 wherein the top and bottom panels (26, 28) have a curved forward edge (26e, 28e) adjacent the mid-location region (25).

7. The inflatable cushion (10, 10A, 10B) of claim 6 wherein the curved forward edge (26e, 28e) has a maximum inward curvature at the mid-location region (25).

8. The inflatable cushion (10, 10A, 10B) of claim 7 wherein the top panel (26) and the bottom panel (28) have a rear edge (26d, 28d) adjacent the door trim.

9. The inflatable cushion (10, 10A, 10B) of claim 1 wherein a rear edge (26d, 28d) is generally straight.

10. The inflatable cushion (10, 10A, 10B) of claim 1 wherein the inflated cushion (10, 10A, 10B) has the top panel (26) and bottom panel (28) having a mid-located curvature (25) extending from a straight portion (29) adjacent a seatback (4) to the larger sized forward end (29), a space between the forward end and the seatback forming a contoured shape (23) occupant space.

11. The inflatable cushion (10, 10A, 10B) of claim 1 further has an internal panel (30) internally sewn or otherwise affixed to the front and rear side panels (22, 24).

12. The inflatable cushion (10, 10A, 10B) of claim 11 wherein the internal panel (30) is generally vertically oriented.

13. The inflatable cushion (10, 10A, 10B) of claim 12 wherein the internal panel (30) helps retain the contoured shape (23) at or near the mid-location region (25).

14. The inflatable cushion (10, 10A, 10B) of claim 1 wherein the inflated airbag cushion (10, 10A, 10B) at the mid-location region (25) has the contoured shape (23) configured to avoid generating forces to move or push the occupant (2) toward an interior and away from the door trim (7) of the vehicle.

15. The inflatable cushion (10, 10A, 10B) of claim 1 wherein the forward end (27) projects at least 20% greater than the mid-location region (25).

* * * * *